(12) United States Patent
Wang et al.

(10) Patent No.: US 12,552,034 B2
(45) Date of Patent: Feb. 17, 2026

(54) ROBOT SYSTEM

(71) Applicant: Mantis Robotics, Inc., Danville, CA (US)

(72) Inventors: Pei Jui Wang, New Taipei (TW); Gerry Vannuffelen, Danville, CA (US)

(73) Assignee: Mantis Robotics, Inc., Danville, CA (US)

( * ) Notice: Subject to any disclaimer, the term of this patent is extended or adjusted under 35 U.S.C. 154(b) by 212 days.

(21) Appl. No.: 18/086,386

(22) Filed: Dec. 21, 2022

(65) Prior Publication Data

US 2023/0202045 A1 Jun. 29, 2023

Related U.S. Application Data

(60) Provisional application No. 63/266,004, filed on Dec. 25, 2021.

(51) Int. Cl.
*B25J 9/16* (2006.01)
*B25J 13/08* (2006.01)

(52) U.S. Cl.
CPC ......... *B25J 9/1676* (2013.01); *B25J 9/1633* (2013.01); *B25J 9/1651* (2013.01); *B25J 13/089* (2013.01)

(58) Field of Classification Search
CPC ...... B25J 9/1676; B25J 9/1633; B25J 9/1651; B25J 13/089; B25J 13/088; B25J 19/06;
(Continued)

(56) References Cited

U.S. PATENT DOCUMENTS 8,874,300 B2 * 10/2014 Allard .................. H04L 67/12
701/28
9,043,025 B2 5/2015 Brooks et al.
(Continued)

FOREIGN PATENT DOCUMENTS

AU 628733 B2 * 9/1992
AU 2008264146 A1 * 7/2009
(Continued)

OTHER PUBLICATIONS

An English-translated version of JP-2020127995-A by Kamiya T et al (Year: 2020).*
(Continued)

*Primary Examiner* — Cuong H Nguyen

(57) ABSTRACT

A robot system for human-robot collaboration is disclosed that includes one or more proximity sensing elements disposed on the movable parts of the robot, joint position sensing sensors, and a safety control module connects the proximity sensing element and joint position sensing sensors and monitors the speed of the robot and the proximity distance to the objects and stop the robot safely when speed exceed the set limit. The safety control module switches the safety status of the robot when a set proximity distance threshold is triggered. Then, multiple embodiments of the safety status triggered by proximity sensing are introduced for different processes of the human-robot collaboration, includes separation monitoring, force limiting for bumping, and manipulation of the robot. Furthermore, embodiments of utilizing different types of sensors to implement the proximity sensing elements are also disclosed.

19 Claims, 6 Drawing Sheets

(58) Field of Classification Search
CPC ........ B25J 9/1694; B25J 13/086; B25J 19/02; G05B 2219/40202; G05B 2219/40544; G05B 2219/40614

See application file for complete search history.

(56) References Cited

U.S. PATENT DOCUMENTS

| | | | |
|---|---|---|---|
| 9,475,200 | B2 | 10/2016 | Schlaich et al. |
| 10,005,184 | B2 | 6/2018 | Gerio et al. |
| 10,144,125 | B2 | 12/2018 | Su et al. |
| 10,245,729 | B2 | 4/2019 | Bordegnoni et al. |
| 10,518,424 | B2 | 12/2019 | Zillich |
| 10,675,767 | B2 | 6/2020 | Takaoki et al. |
| 10,710,252 | B2 | 7/2020 | Roziere et al. |
| 10,800,032 | B2 | 10/2020 | Kamisono et al. |
| 10,828,776 | B2 | 11/2020 | Oyama |
| 10,828,791 | B2 | 11/2020 | Fujita |
| 10,919,157 | B2 | 2/2021 | Roziere et al. |
| 10,976,460 | B2 | 4/2021 | Neel et al. |
| 11,060,890 | B2 | 7/2021 | Kamiya et al. |
| 11,345,040 | B2 * | 5/2022 | Oleynik ............ G05B 19/4183 |
| 11,351,674 | B2 | 6/2022 | Neel et al. |
| 11,424,027 | B2 * | 8/2022 | Shelton, IV ......... A61B 17/072 |
| 11,998,193 | B2 * | 6/2024 | Shelton, IV ......... A61B 17/068 |
| 12,097,079 | B2 * | 9/2024 | Lin ..................... A61B 34/35 |
| 12,318,117 | B2 * | 6/2025 | Barakat ................. B25J 13/065 |
| 2012/0184955 | A1 * | 7/2012 | Pivotto ................. A61B 34/30 606/41 |
| 2015/0301532 | A1 * | 10/2015 | Norris ...................... B60T 7/22 701/23 |
| 2018/0311814 | A1 * | 11/2018 | Kamisono ............. B25J 13/086 |
| 2019/0061155 | A1 * | 2/2019 | Hashimoto ........... B25J 9/1666 |
| 2019/0143512 | A1 | 5/2019 | Corkum et al. |
| 2019/0368658 | A1 * | 12/2019 | Sato ....................... B25J 19/027 |
| 2020/0130623 | A1 | 4/2020 | Baldinger et al. |
| 2020/0315721 | A1 * | 10/2020 | Rabindran ............. A61B 34/37 |
| 2020/0338720 | A1 | 10/2020 | Yamamoto et al. |
| 2020/0368924 | A1 | 11/2020 | Neel et al. |
| 2021/0231718 | A1 | 7/2021 | Neel et al. |
| 2021/0268669 | A1 | 9/2021 | Kamon et al. |
| 2023/0101714 | A1 * | 3/2023 | Shelton, IV .......... A61B 34/30 600/109 |

FOREIGN PATENT DOCUMENTS

| | | | | | |
|---|---|---|---|---|---|
| CA | 2648972 | A1 | * | 6/2009 | ............ B60L 53/64 |
| CA | 2925695 | C | * | 9/2021 | ............ G06F 3/046 |
| CN | 109773832 | A | * | 5/2019 | ............ B25J 13/085 |
| EP | 3395510 | | | 10/2018 | |
| FR | 2614481 | A1 | * | 10/1988 | ............... H02P 5/41 |
| FR | 3115719 | | | 5/2022 | |
| GB | 2460500 | A | * | 12/2009 | ............... H02J 7/04 |
| JP | 2020127995 | A | * | 8/2002 | ............... B25J 19/06 |
| JP | 2022525041 | A | * | 5/2022 | ............... G05D 1/02 |
| NO | 172314 | B | * | 3/1993 | ........... G05B 19/423 |
| WO | WO 8304324 | A1 | * | 12/1983 | ............ G05B 19/42 |
| WO | WO-9722782 | A1 | * | 6/1997 | ............ B25J 9/1075 |
| WO | 2020049230 | | | 3/2020 | |
| WO | 2021099042 | | | 5/2021 | |

OTHER PUBLICATIONS

An English-translated version of CN113525340A by Ge Sanwangjie.*
An English-translated version of CA2648972A1 by Mayer et al.*
Oswal, Saharsh, and D. Saravanakumar. "Line following robots on factory floors: Significance and Simulation study using CoppeliaSim." IOP Conference Series: Materials Science and Engineering. vol. 1012. No. 1. IOP Publishing, 2021. (Year: 2021).*
Csencsics, Ernst, et al. "Supplemental peak filters for advanced disturbance rejection on a high precision endeffector for robot-based inline metrology." IEEE/ASME Transactions on Mechatronics 27.4 (2021): 2258-2266. (Year: 2021).*
Kershaw, Joseph, et al. "Hybrid machine learning-enabled adaptive welding speed control." Journal of Manufacturing Processes 71 (2021): 374-383. (Year: 2021).*
Nicora, Matteo Lavit, et al. "Human-robot collaboration in smart manufacturing: Robot reactive behavior intelligence." Journal of Manufacturing Science and Engineering 143.3 (2021): 031009. (Year: 2021).*

* cited by examiner

US 12,552,034 B2

ROBOT SYSTEM

This application claims the benefit of U.S. Provisional Patent Application No. 63/266,004, filed Dec. 25, 2021, which is hereby incorporated by reference herein in its entirety.

FIELD

This disclosure relates to robotic systems and, more particularly, to safety systems for robots in human-robot collaboration.

BACKGROUND

Robotic systems are often used for industrial purposes. Such robotic systems include industrial robots. Care should be taken to ensure that industrial robots operate safely when in close proximity to humans (users).

Human-robot collaboration (HRC) is increasingly important in the development of industrial robots for better flexibility, ease-of-use, and physical footprint reduction in the manufacturing industry. If care is not taken, robots operating in HRC can pose health or safety risks to nearby humans.

SUMMARY

A robot system is introduced. The robot system may include a robot manipulator (robot arm) and a control module. The control module can include a motion control module and a safety control module. The safety control module, having a speed monitoring function, may monitor the speed of the robot's body based on the robot's joint motion. The robot system may also include a power and force limiting (PFL) function that can detect and monitor external force and that can sense and limit bumping force.

The robot system may include proximity sensors (e.g., one or more proximity sensing elements) mounted on the robot's movable parts. Both the PFL function and the proximity sensor may operate in the safety module as safety functions of the robot. The PFL and proximity sensor may work together with the speed monitoring function to perform a safe and easy integration into a HRC scenario. The PFL functions may be integrated and coordinated with different types of sensors.

DETAILED DESCRIPTION

The following description provides specific details for a thorough understanding of and enabling description for the disclosed embodiments. One of ordinary skill in the art will understand that one or more embodiments may be practiced without one or more of such specific details. In some instances, specific description of well-known structures or functions may have been omitted to avoid unnecessarily obscuring the description of the embodiments.

Unless the context clearly requires otherwise, the words "comprise," "comprising," and the like are to be construed in an inclusive sense as opposed to an exclusive or exhaustive sense. The words "herein," "above," "below", when used in this description, refer to this description as a whole and not to any particular portions of this description. When the claims use the word "or" in reference to a list of two or more items, that word covers all of the following interpretations of the word: any of the items in the list, all of the items in the list, and any combination of the items in the list. When the word "each" is used to refer to an element that was previously introduced as being at least one in number, the word "each" does not necessarily imply a plurality of the elements but can also mean a singular element.

For a robot operating in HRC, there are several ways to achieve HRC through built-in functions of the robot. For example, in ISO 10218-1 (Robots and robotic devices—Safety requirements for industrial robots—Part 1: Robots), two main methods are introduced: "power and force limiting" (PFL), and "speed and separation monitoring." The former limits force applied to the human body when a robot bumps into a human, and the latter prevents contact between the robot and a human.

In PFL systems, the robot is equipped with a joint current sensor, joint torque sensor, or force-torque sensor to measure the external force. In speed and separation monitoring systems, light curtains or lidar are used to detect intrusion of humans into the working area of the robot and to stop the robot. However, such systems are not adapted to accommodate for error-triggering, switching between different collaborative speeds, and protection when a human is hand guiding a robot, which inevitably applies force and manipulates the robot in the same workspace. Therefore, it may be desirable to be able to provide improved built-in safety designs for robots that can solve these problems and provide improved efficiency to the HRC.

Figure 1:
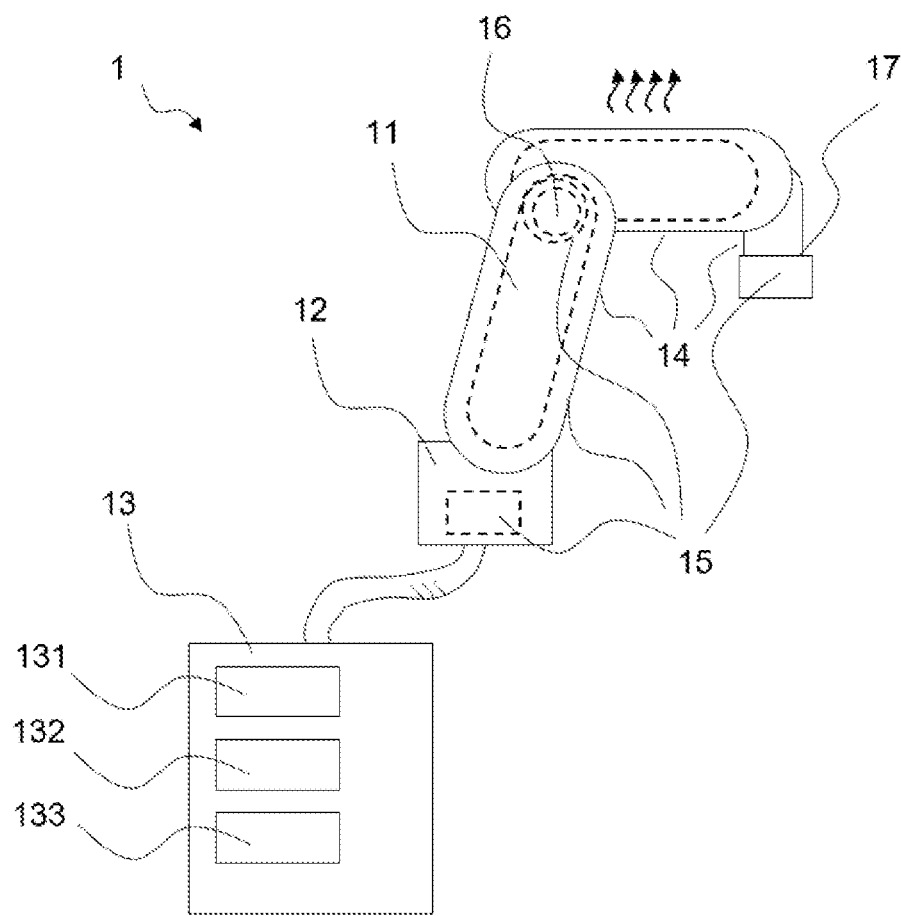
FIG. 1 is a diagram of an illustrative robot system in accordance with some embodiments.

FIG. 1 is a diagram of an illustrative robot system (sometimes referred to herein as a robotic system or an industrial robot system). As shown in FIG. 1, the robot system may include a robot such as robot 1 (e.g., a robotic arm). Robot 1 may include one or more (e.g., multiple)

movable parts 11. Movable parts 11 may be actuated by actuators, for example. Movable parts 11 may sometimes be referred to herein as movable members 11, movable components 11, movable segments 11, or movable portions 11 of robot 1. Each movable part 11 may include a rigid housing or frame, for example.

Robot 1 may include a support structure such as mounting base 12. At least one movable part 11 may be mounted to mounting base 12. Robot 1 may include control equipment such as controller 13. Controller 13 may, for example, include one or more processors (e.g., central processing units (CPUs), graphics processing units (GPUs), integrated circuits (ICs), application specific integrated circuits (ASICs), microprocessors, etc.) and storage such as storage device 133 (e.g., storage circuitry, non-volatile memory, volatile memory, one or more hard drives, solid state drives, read-only memory, flash memory, etc.). Storage device 133 may store processing instructions such as software code. The one or more processors may control the operations of robot 1 and/or one or more components of the robot system by running or executing code stored on storage device 133.

Controller 13 may include a motion control module 131 (sometimes referred to herein as motion controller 131, motion control processor 131, motion control circuitry 131, or motion control engine 131) and a safety control module 132 (sometimes referred to herein as safety controller 132, safety control processor 132, safety control circuitry 132, or safety control engine 132). If desired, controller 13 may receive user input from a user or operator of robot 1 or the robot system (e.g., via a user input device). Controller 13 may also generate output for the user (e.g., audio output, visual output on a display or other visual indicator, haptic or vibrational output, etc.).

Robot 1 may also include one or more (e.g., multiple) proximity sensing elements 14 (sometimes referred to herein as proximity sensors 14). Proximity sensing elements 14 may be disposed on one or more movable parts 11. If desired, proximity sensing elements 14 may cover some, substantially all, or all of one or more of moveable parts 11. Two or more movable parts 11 may be coupled together at a joint. The two or more movable parts may be movable (e.g., translatable, rotatable, etc.) with respect to each other about the joint. For example, two movable parts 11 may be coupled together and movable/rotatable about an elbow joint.

One or more movable parts 11 may have a tool end 17 (e.g., the end of the robot opposite mounting base 12). The tool end may include tool mounting structures that are configured to receive one or more tools to be mounted to robot 1. Robot 1 may perform any desired operations using the tool(s) mounted at the tool end (e.g., industrial operations, machining operations, manufacturing operations, sensing operations, mechanical operations, etc.).

Robot 1 may include one or more joint monitoring elements 16. Proximity sensing elements 14 and joint monitoring elements 16 may be communicably coupled to safety control module 132 (e.g., via one or more wired and/or wireless links). For example, controller 13 may be coupled to robot 1 via one or more data, control, and/or power lines (e.g., over one or more cables). Controller 13 may send control signals that control the operation of robot 1 over the one or more cables. Controller 13 may receive signals from robot 1 (e.g., proximity sensing elements 14 and joint monitoring elements 16) over the one or more cables.

Joint monitoring elements 16 (sometimes referred to herein as joint position sensors 16 or joint position detectors 16) may include encoders and/or current/velocity/pulse monitoring components in the servo drivers of the actuators for movable parts 11. Joint monitoring elements 16 may generate speed and position information associated with the joints. Joint monitoring elements 16 may transmit the speed and position information to safety control module 132. Joint monitoring elements 16 may sometimes be referred to herein as joint monitoring components 16 or joint monitors 16. One or more force limiting sensing elements 15 may be disposed on robot 1.

Figure 2:
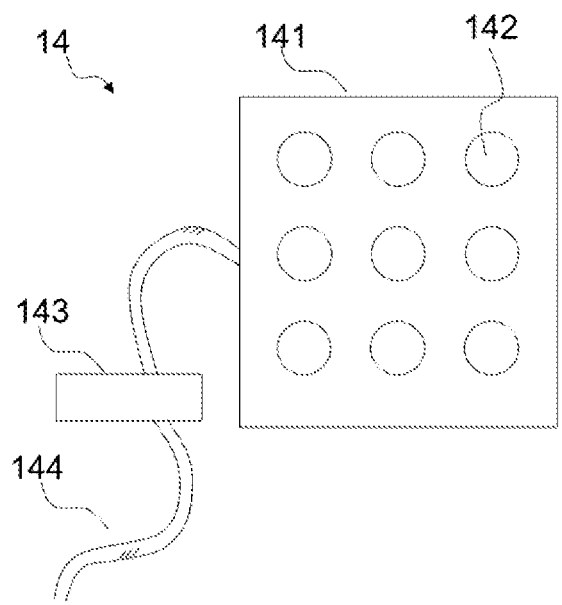
FIG. 2 is a diagram of an illustrative proximity sensor in accordance with some embodiments.

Proximity sensing elements 14 may include any desired types of proximity sensors. Each proximity sensing element 14 may monitor (e.g., continuously) the proximity (distance) of external objects with respect to movable part(s) 11 within a corresponding Field of View (FOV) and detection range. FIG. 2 is a diagram showing one example of an illustrative proximity sensing element 14.

As shown in FIG. 2, proximity sensing element 14 may include a physical structure such as support structure 141 (sometimes referred to herein as support 141). Support structure 141 may carry one or more proximity-sensing areas 142 (e.g., active sensing regions, sometimes referred to herein as proximity sensing cells 142). Support structure 141 may be attached, adhered, or affixed to a corresponding movable part 11 on robot 1. If desired, support structure 141 may be formed from an integral part of movable part 11 (e.g., from a portion of a housing, shell, or frame of movable part 11).

Proximity sensing element 14 may include one or more (e.g., multiple) proximity sensing cells 142. Proximity sensing cells 142 may be arranged in a pattern, grid, or array. Each proximity sensing cell 142 may have a corresponding FOV. The pattern of proximity sensing cells 142 on support structure 141 may allow the FOV of each individual proximity sensing cell 142 to be seamlessly combined together to provide proximity sensing element 14 with an overall combined FOV that is as large as possible (e.g., covering some or all of the space around the corresponding movable part 11).

Proximity sensing element 14 may also include a proximity sensing processing module 143 (sometimes referred to herein as proximity sensing processor 143, proximity sensing processing engine 143, or proximity sensing processing circuitry 143). Proximity sensing module 143 may include an MCU, DSP or FPGA, as examples. Proximity sensing processing module 143 may be communicably coupled to each of the proximity sensing cells 142 on support structure 141.

Proximity sensing cells 142 may generate sensor signals (e.g., electrical signals carrying sensor information) in response to the proximity of one or more external objects (e.g., a user, part of the user's body, or another object that is not part of robot 1) at, near, or adjacent to the corresponding movable part 11. Proximity sensing cells 142 may output (transmit) the sensor signals to proximity sensing processing module 143. Proximity sensing processing module 143 may process the sensing signals output by proximity sensing cells 142 and may convert the sensing signals into digital information (data). Proximity sensing processing module 143 may transmit the digital information to controller 13 over a data path such as safety rated filed bus 144. Safety rated filed bus 144 may communicably couple all the proximity sensing elements 14 on robot 1 together and to safety control module 132 in controller 13 (FIG. 1) to deliver a proximity sensing result to safety control module 132.

Each proximity sensing cell 142 may include one or more infrared (IR) sensors, ultrasonic sensors, capacitive sensors, radar sensors, 3D lidar sensors, and/or micro 3D cameras.

Different sensor types may correspond to a different arrangement/configuration and/or quantity of proximity sensing cells 142 in the proximity sensing elements 14. For example, a capacitive type of proximity sensing cell 142 may include one or more capacitor electrodes. If desired, proximity sensing element 14 may include a single proximity sensing cell 142 having a capacitor electrode that covers all of support structure 141. In other implementations, proximity sensing element 14 may include an array of proximity sensing cells 142 each having respective capacitor electrodes (e.g., as shown in FIG. 2). Disposing an array of capacitor electrodes on support structure 141 may allow the proximity sensing element to perform multiple readings (e.g., through different proximity sensing cells) to bring an array of detections in the coverage (e.g., an array of sensor data), which can be used to detect additional structural information about the external object, for example.

Figure 3:
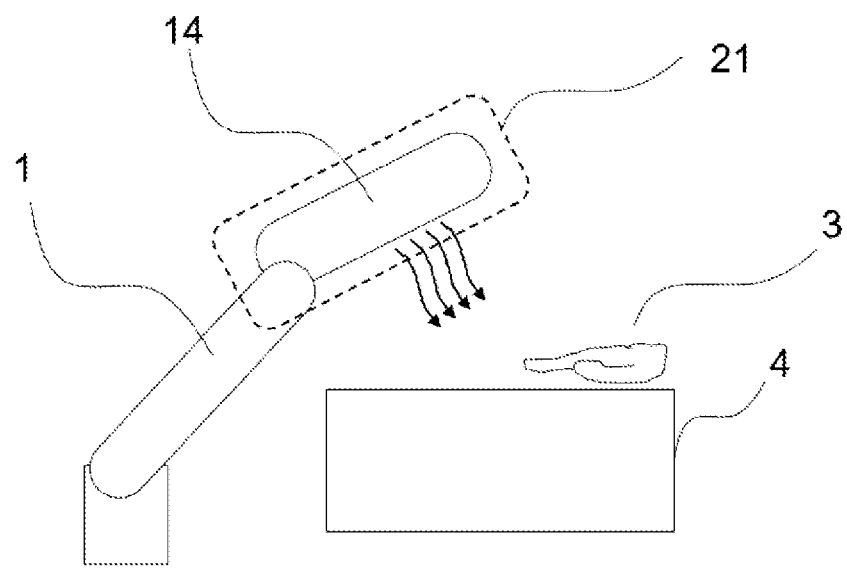
FIG. 3 is a diagram showing how an illustrative proximity sensor can be used to stop a robot in HRC in accordance with some embodiments.

FIG. 3 shows one example in which safety control module 132 (FIG. 1) continuously monitors the readings of each proximity sensing element 14 on robot 1 using a first proximity sensing threshold. When proximity sensing element 14 detects that an external object has crossed within the first proximity sensing threshold (e.g., within first threshold distance 21 from proximity sensing element 14, or when the sensing signals generated by proximity sensing element 14 exceed a first threshold value), controller 13 may control robot 1 to safely stop motion and/or operation of the robot.

The stopping performance of a robot, or the stopping distance and stopping time of a robot are further determined by a combination of the robot's motion speed, the pose or the reach of the robot, and the payload of the robot in the tool end, in each application. Higher speed, reach, and payload generally leads to a higher stopping time and stopping distance than lower speeds, reaches, and payloads. Since in a set work (task) assigned to the robot, both the pose or the reach of the robot in a sequence of motion and the payload of the robot should follow the intention of the automation process or the set programming, the robot system may only be able to control and adjust motion speed. So, in an HRC scenario, a "Collaborative speed" should be performed and monitored safely. Exceeding the collaborative speed may cause a worse bumping result that may result in harm to a user.

If desired, proximity sensing may be used to achieve separation monitoring for HRC with a scenario to let the robot always stop before hitting a person, and the proximity triggering distance for an initial stop should be longer than the stopping distance. For example, safety control module 132 (FIG. 1) may be configured to limit the robot's speed to a first collaborative speed in conjunction with the set first proximity sensing threshold to allow the robot to stop before hitting a person. In this case, the set first collaborative speed and/or the set first proximity sensing threshold should consider the worst case of the combination of the rest of the conditions that may affect the stopping performance to the robot, including the robot's pose and payload. In more advanced implementations, safety control module 132 can also monitor the pose and the payload of the robot to evaluate the stopping performance at that instance, to judge and set a suitable combination of the set first collaborative speed and the set first proximity sensing threshold.

The speed of specific points on the robot's movable parts can be monitored by safety control module 132 according to the information received from joint monitoring elements 16 and the kinematics of the robot. Such points may sometimes be referred to herein as speed monitoring points. The speed monitoring points may include the tool center point (TCP) of the robot, convex points of each joint, the elbow of the robot, the tool mounted on tool end 17 of the robot, and/or the convex points of the gripped objects by the tool, as examples.

In addition, the safety control module 132 may bypass the collaborative speed to the motion control module 131. Motion control module 131 (FIG. 1) may suppress or adjust the programmed speed of the robot to cause the speed of the speed monitoring points of the robot to remain lower than a safety limit. This may serve to reduce the likelihood of the robot triggering safety speed limits to have a convenient safe collaborative application when the collaborative speed limit is enabled/disabled dynamically with safety field sensors such as light curtains, or when switching between different levels of collaborative speed limits.

Figure 4:
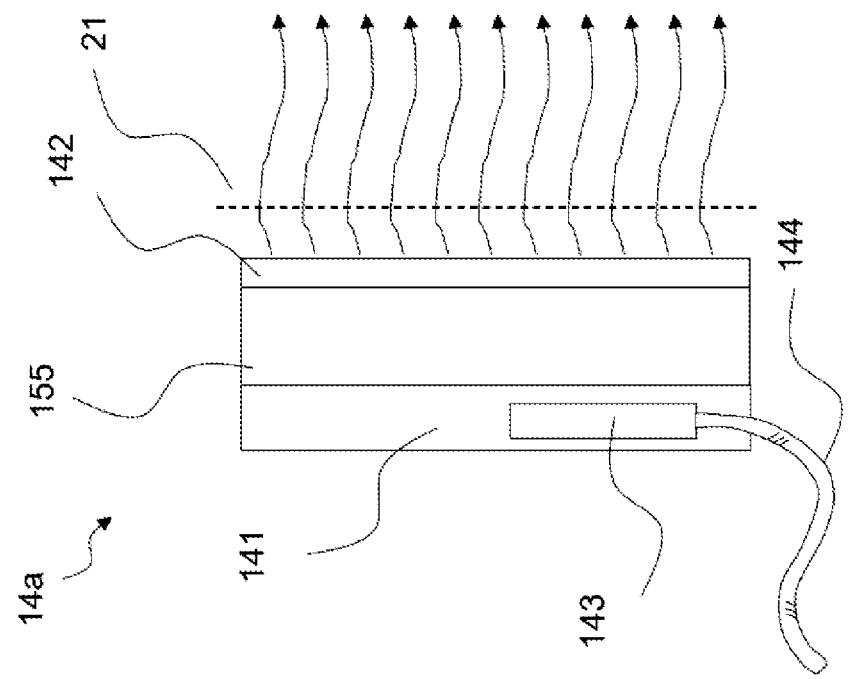
FIG. 4 is a diagram of an illustrative proximity sensor having a deformable structure to limit bumping force in accordance with some embodiments.

FIG. 4 shows an example of how a given proximity sensing element 14 such as proximity sensing element 14a may operate. The left-hand side of FIG. 4 may be mounted to the robot's movable parts. As shown in FIG. 4, proximity sensing element 14a may include a deformable structure 155 (sometimes referred to herein as deformable layer 155). Deformable structure 155 may be mechanically deformable in one or more directions. Deformable structure 155 may include plastic, polymer, elastomeric materials, rubber, foam, materials containing one or more air chambers, or any other desired deformable materials. One or more proximity sensing cells 142 may be mounted to deformable structure 155 (e.g., deformable structure 155 may be layered or interposed between proximity sensing cell 142 and support structure 141). Proximity sensing processing module 143 may be disposed on or within support structure 141 or may, if desired, be disposed separate from support structure 141. The combined stroke of a predetermined depth of deformation of the structure 155 and the proximity sensing threshold (e.g., threshold distance 21) may trigger a stop that is larger than the stopping distance of the robot. By considering the deformation characteristics, a force limiting HRC safety function can be achieved. This design can set a shorter proximity distance threshold, so the robot will not be easily triggered erroneously by its environment, which makes programming easier. The arrangement of FIG. 4 may achieve a force limiting function without any force sensors, for example.

Figure 5:
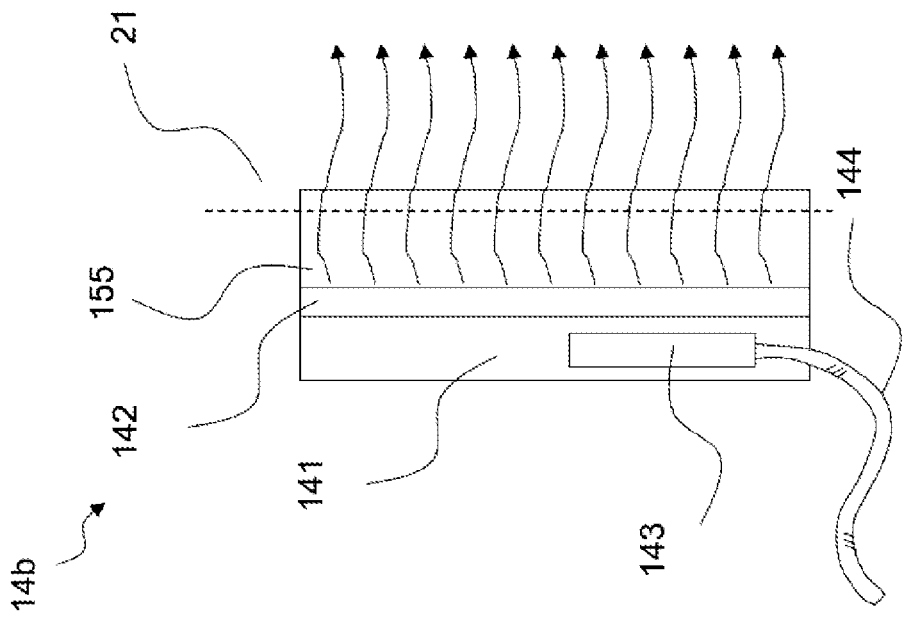
FIG. 5 is a diagram of an illustrative proximity sensor having a deformable structure to perform concurrent proximity sensing and PFL sensing in accordance with some embodiments.

FIG. 5 shows an example in which the same proximity sensor is used to perform concurrent proximity sensing and force sensing. As shown in FIG. 5, proximity sensing cell(s) 142 may include capacitive proximity sensor(s) mounted behind deformable structure 155 (e.g., an electrically insulated soft structure). Proximity sensing cell(s) 142 may, for example, be layered or interposed between deformable structure 155 and support structure 141. Proximity sensing cell(s) 142 may perform proximity sensing through deformable structure 155. So, a longer distance of measurement (e.g., the distance longer than the thickness of the deformable structure 155) can be used in proximity sensing. When the measured distance (e.g., as measured by cell(s) 142) is lower than the thickness of deformable structure 155, the information can function as the force limit sensing measurement. This design enables the option to keep the proximity triggered stop within the depth of the deformable structure by setting the proximity sensing threshold (e.g., threshold distance 21) shorter than the thickness of the un-compressed thickness of the deformable structure, which totally removes error triggering the environment with a stop. At the same time, the rest range of the proximity detection can be utilized to improve the convenience and efficiency of a HRC scenario.

If desired, two features that utilize proximity sensing to improve the convenience and efficiency of a HRC scenario may be used. The first feature may be to trigger switching between a normal collaborative speed and a lower collaborative speed near objects. The second feature may be using proximity to perform guiding of the robot for the purpose of teaching the robot.

Switching between a normal collaborative speed and a lower collaborative speed near objects may bring more productivity to the robot in an HRC scenario. In the case of utilizing the proximity sensor to prevent bumping with humans, the motion speed is related to the triggering distance to stop the robot. A longer stop-triggering proximity distance may bring inconvenience to the user because of the need to keep it from detecting the environment. Switching to a lower speed when the robot moves near objects can reduce the triggering distance. For the force limiting case for HRC, it is even more critical.

The human body can be modeled by a mass-spring-damper system. In the most simplified modeling, the stopping distance will decide the bumping force, like a rigid body compressing a spring. In ISO/TS 15066, a reference of allowance of the maximum bumping force/pressure (transient force/pressure) and clamping force/pressure (quasi-static force/pressure) of the human body regions are introduced. For the non-clamping case, the robot hits the human body regions that are free to move in the space, like the human arm, or even the whole human body in an open space. For the clamping case, where human body regions will be clamped between the robot and the environment, such as the human hand being clamped between the robot and a table. Due to the nature of bumping physics, to fulfill the requirements of bumping force in ISO/TS 15066 for HRC, the clamping case will require a better stopping performance, which means a lower collaborative speed when near objects. If a robot's safety system can only monitor and perform one collaborative speed, considering both cases above—the robot can only work in a lower collaborative speed, resulting in lower productivity.

If desired, safety control module 132 may automatically switch the robot to a lower collaborative speed that is suitable for motion near objects. In this type of design, proximity sensing element 14 can still have a proximity stop function (e.g., as shown in FIG. 4 or FIG. 5), or other sensors to perform PFL may be added.

If desired, force limiting sensing elements 15 of FIG. 1 may be communicably coupled to safety control module 132. Force limiting sensing elements 15 may include a force/torque sensor mounted in the base 12 and/or in the tool end 17 of the robot, joint current sensors placed in the servo driver of the actuators of the robot, and/or joint torque sensors mounted in the actuator of the robot, as examples. The above listed types of the force limiting sensing elements 15 may generate readings (e.g., sensing signals) that are transmitted to safety control module 132.

Safety control module 132 may use the readings from force limiting sensing elements 15 to calculate and compensate for the effect on the robot's motion (e.g., pose, speed and acceleration) based on information from joint monitoring elements 16. Safety control module 132 may then evaluate the external force. Additionally or alternatively, safety control module 132 may construct a dynamic model of the robot system based on the information from joint monitoring elements 16 and may compare the estimated torque, force, or current with the readings from force limiting sensing elements 15 (sometimes referred to herein as force limiting sensors 15). Safety control module 132 may then monitor whether the difference is higher than a set (predetermined) limit. If safety control module 132 detects or determines that the difference exceeds the set limit, controller 13 may stop the robot safely to construct the PFL function of the robot.

Figure 6:
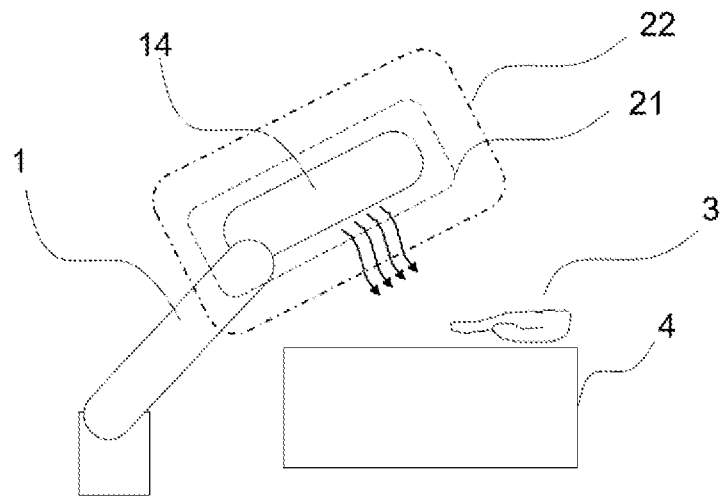
FIG. 6 is an illustrative diagram showing how collaborative speed may be switched based on the proximity detection of an object in accordance with some embodiments.

FIG. 6 shows one example of how the example of FIG. 4 may be used to achieve force limiting and switching collaborative speed near objects. As shown in FIG. 6, controller 13 may set a second proximity sensing threshold (e.g., corresponding to second threshold distance 22) that is farther than the first proximity sensing threshold (e.g., first threshold distance 21 associated with the stopping distance of the robot). When the proximity sensing element detects an external object (e.g., an inanimate environmental object 4 or a portion 3 of a human body) within first threshold distance 21, the controller may slow down the robot to a clamping case collaborative speed.

Figure 7:
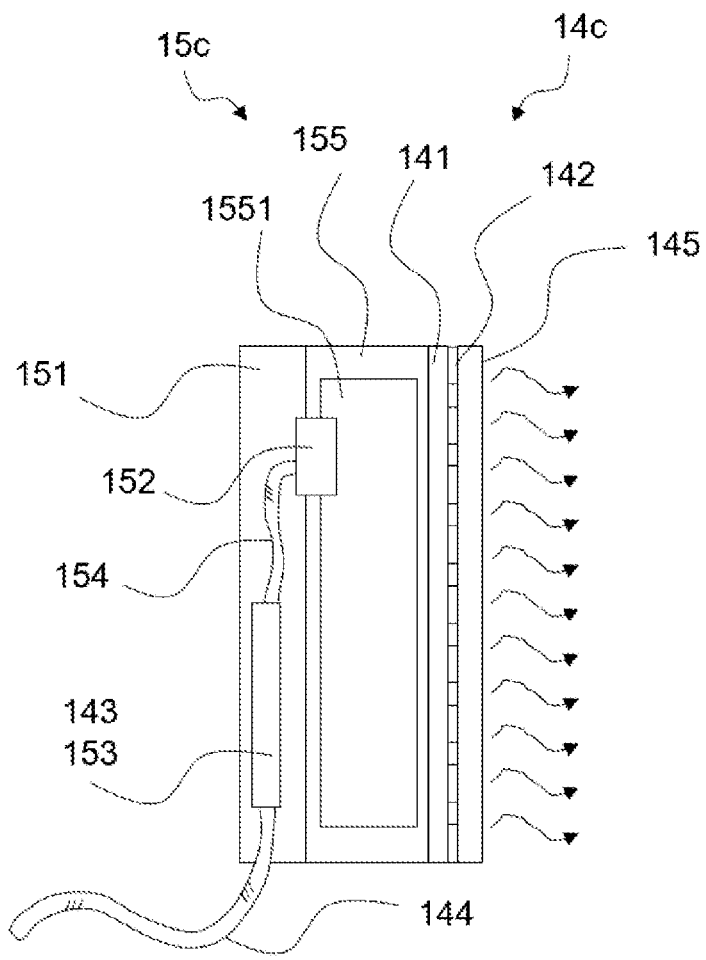
FIG. 7 is a diagram of an illustrative combined proximity sensor and PFL sensing element that includes an air flow or air pressure sensor with a deformable structure in accordance with some embodiments.
Figure 9:
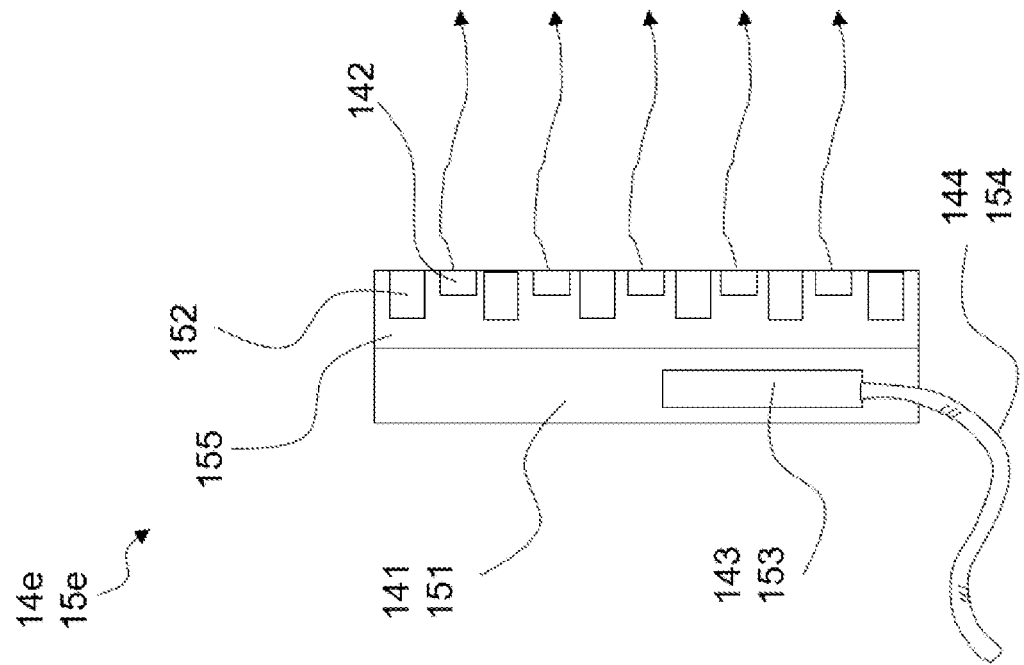
FIG. 9 is diagram showing how illustrative proximity sensors and pressure sensors may be arranged together as a PFL element in the same deformable structure in accordance with some embodiments.
Figure 8:
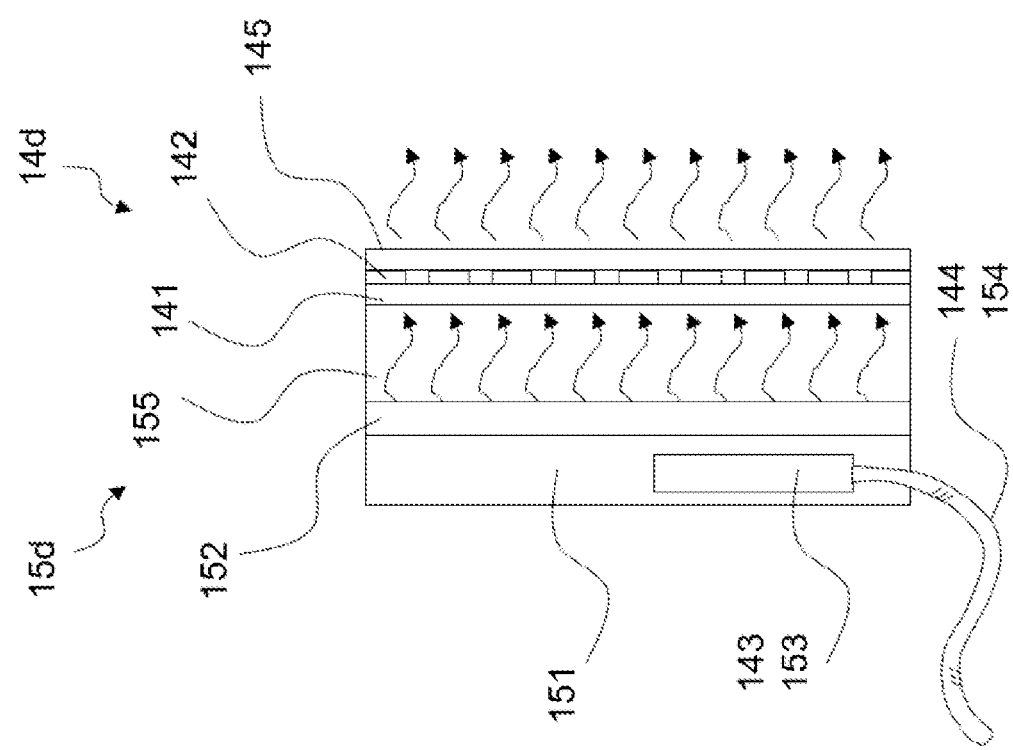
FIG. 8 is a diagram of an illustrative combined proximity sensor element and PFL element that includes an additional proximity sensor with a deformable structure in accordance with some embodiments.

FIGS. 7-9 show examples of building the PFL function through sensors mounted on and/or covering the robot's movable parts 11 and that are integrated with proximity sensing element 14. As shown in FIG. 7, a force limiting sensing element 15 such as force limiting sensing element 15c may be integrated within a proximity sensing element 14 such as proximity sensing element 14c. Proximity sensing element 14c may include any type of proximity sensor. Proximity sensing element 14c may include a protective cover layer 145 in its outmost layer to protect proximity sensing cells 142.

The material of protective cover layer 145 may be selected to allow proximity sensing to be performed through protective cover layer 145. Protective cover layer 145 may, for example, include a visibly opaque material when proximity sensing cell(s) 142 include IR proximity sensing cell(s) (e.g., when proximity sensing element 14c is an IR proximity sensor), an electrically insulated material when proximity sensing cell(s) 142 include capacitive proximity sensing cell(s), or a layer of lightweight material that can pass acoustic (e.g., ultrasonic) vibrations to and/or from the air when proximity sensing cell(s) 142 include ultrasonic proximity sensing cell(s) (e.g., when proximity sensing element 14c is an ultrasonic proximity sensor).

Proximity sensing cell(s) 142 may be coupled to proximity sensing processing module 143 via support structure 141. Force limiting sensing elements 15c may be disposed behind support structure 141 (e.g., proximity sensing cell(s) 142 may be interposed between protective cover layer 145 and support structure 141). If desired, deformable structure 155 may include a deformable air chamber such as air chamber 1551. Force limiting sensing elements 15c may include a sensor 152 such as an air flow or air pressure sensor that detects the deformation of deformable structure 155 (e.g., air chamber 1551) by sensing air flow or changes in air pressure.

Sensor 152 may include an output 154 (e.g., a simple IO, analog signal, or safety communication) coupled to force sensing processing module 153. A carrier 151 may carry both proximity sensing element 14c and force limiting sensing element 15c. Carrier 151 may be mounted, attached, adhered, or affixed to a movable part 11 of robot 1 or may be formed from an integral part (e.g., part of the housing) of movable part 11. To better sustain the impact from bumping, proximity sensing cell(s) 142 may be constructed using a Flexible Printed Circuit (FPC), as one example. Processing modules 143 and 153 may be the same MCU, DSP or FPGA, if desired, to process both the proximity sensing and the force limit sensing. The force is estimated by measuring the deformation of the deformable structure 155.

FIG. 8 shows one example in which force limiting sensing elements 15 such as force limiting sensing elements 15d are constructed by another layer of (proximity) sensor 152, for example a capacitive sensor that includes a deformable structure 155 that also transmits proximity sensing signals for proximity sensor 152. In this example, the distance to support structure 141 can be detected by sensor 152. So, sensor 152 can measure the deformation of deformable structure 155 in a compressed situation by detecting the proximity distance between sensor 152 and support structure 141 (e.g., support structure 141 may form a detection layer for sensor 152).

In the examples of FIGS. 7 and 8, the sequence in the direction from the robot's mounting side to the outmost layer for elements 14 and 15 are not limited by the cases shown. The structure of the force limiting sensing elements 15 can also be arranged in the outmost layer, while proximity sensing element 14 arranged behind it, as long as the material of the structure of force limiting sensing elements 15 can let proximity sensing pass through. For example, a capacitive sensing proximity sensor arranged behind a deformable structure 155 constructed by electrically insulated material, or an optical proximity sensor behind force limiting sensing elements 15 with opaque thin-film deformable and pressure sensitive material.

FIG. 9 shows one example in which force limiting sensing elements 15e are piezoelectric sensors (with sensor 152), arranged in the same layer as proximity sensing cell(s) 142 of proximity sensing element 14e.

Figure 10:
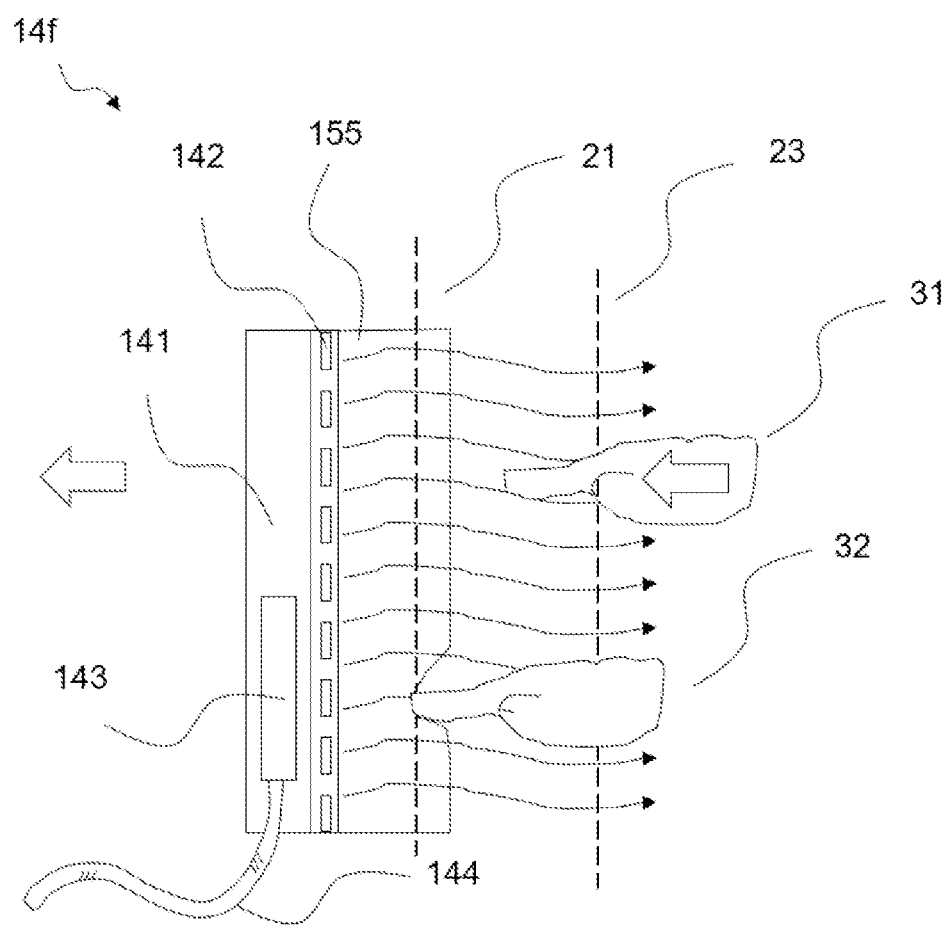
FIG. 10 is diagram showing how a robot may be guided through proximity sensing while having PFL in accordance with some embodiments.

FIG. 10 shows an example that allows proximity sensing to perform guiding of the robot with a monitored guiding speed, while having the force limiting function at the same time to ensure the safety of the user. The robot may have a guiding mode that includes proximity guiding function. The readings of the proximity sensing cell 142 are not only sent through a safety communication bus 144 to the safety control module 132, but are also passed to the motion control module 131 (FIG. 1).

When the robot is switched to the guiding mode by a physical switch or software buttons within the user interface, the safety control module switches the speed limit to a set guiding speed limit. The safety control module also monitors whether any proximity reading is lower than the first proximity sensing threshold (e.g., within threshold distance 21). If so, the controller stops the robot safely. Within the range between the first and second proximity thresholds (e.g., between threshold distances 23 and 21), such as when a user's hand 3 in position 31 approaches the robot's cover, motion control module 131 may control the robot to move along the approaching direction of the user's hand (e.g., away from the user).

Furthermore, through establishing a gesture recognition algorithm in the motion control module 131, more manipulation actions can be performed, like rotating a specific joint of the robot. When user's hand pushes into the deformable structure 155 to pose 32, the robot stops safely. By setting the first proximity threshold (e.g., first threshold distance 21) within the thickness of the deformable structure 155, when user's hand touches and pushes into the deformable structure 155, proximity guiding can still function, providing the advantage to prevent error triggering cases in the air by providing a physical support to user's hand.

While a particular form of the invention has been illustrated and described, it will be apparent that various modifications can be made without departing from the spirit and scope of the proposed disclosure. For example, various other types of sensors 31 and resilient member 32 may be included. The foregoing embodiments may be implemented individually or in any combination.

What is claimed is:

1. A robot system comprising:
movable parts having a base and a tool end;
at least one actuator configured to drive at least one of the movable parts;
a proximity sensor disposed on at least one of the movable parts;
a joint position sensor communicatively coupled to the at least one actuator;
one or more processors configured to
measure a speed of the movable parts using the joint position sensor,
measure a distance to an object using the proximity sensor,
stop motion of the movable parts in response to the measured speed exceeding a speed limit, and
slow or stop the motion of the movable parts when the measured distance falls below a distance threshold; and
a sensing element of force or torque, the sensing element of force or torque being different from the proximity sensor and being communicatively coupled to the one or more processors, the one or more processors being further configured to
compute, based on a reading from the sensing element of force or torque, a dynamic model of the movable parts to generate an estimated external force exerted on at least the tool end,
slow down a speed monitoring point to a set speed in response to the measured distance falling below the distance threshold, wherein the speed monitoring point is located at the tool end or on a tool attached to the tool end,
stop the movable parts in response to the estimated external force exceeding a set limit, and
stop the movable parts in response to the speed monitoring point moving faster than the speed limit.

2. The robot system of claim 1, wherein the proximity sensor comprises one or more proximity sensing cells and a deformable layer overlapping the one or more proximity sensing cells.

3. The robot system of claim 2, wherein the proximity sensor further comprises a support coupled to at least one of the movable parts, the one or more proximity sensing cells being interposed between the support and the deformable layer.

4. The robot system of claim 3, wherein the distance threshold is within the deformable layer.

5. The robot system of claim 2, wherein the proximity sensor further comprises a support coupled to at least one of the movable parts, the deformable layer being interposed between the support and the one or more proximity sensing cells.

6. The robot system of claim 1, wherein the one or more processors is configured to stop the motion of the movable parts when the measured distance falls below the distance threshold.

7. The robot system of claim 1, wherein the one or more processors is configured to slow the motion of the movable parts to below an additional speed limit lower than the speed limit when the measured distance falls below the distance threshold.

8. The robot system of claim 7, wherein the one or more processors is configured to stop the motion of the movable parts when the measured distance falls below an additional distance threshold, the additional distance threshold being less than the distance threshold.

9. The robot system of claim 8, wherein the one or more processors is configured to slow but not stop the motion of the movable parts when the measured distance is below the distance threshold and above the additional distance threshold.

10. The robot system of claim 1, wherein the set speed is the lower of:
- a speed according to a set estimated external force limit, and
- a speed according to the distance threshold.

11. The robot system of claim 1, the robot system being operable using a guide mode, the guide mode comprising a guiding function in which the one or more processors controls the motion of the movable parts according to distance readings from the proximity sensor.

12. The robot system of claim 11, wherein under the guide mode, the one or more processors disables a triggering function for the distance threshold.

13. The robot system of claim 11, wherein under the guide mode, the one or more processors is configured to stop the motion of the movable parts when the measured distance falls below the distance threshold and wherein the distance threshold is lower than a maximum allowable triggering distance of guiding.

14. The robot system of claim 1, wherein the sensing element of force or torque comprises a sensor selected from the group consisting of: a joint current sensor, a joint torque sensor, a force-torque sensor mounted to the tool attached to the tool end of the movable parts, and a force-torque sensor mounted to the base of the movable parts.

15. The robot system of claim 1, wherein the sensing element of force or torque comprises:
- an additional proximity sensor; and
- a deformable structure on the additional proximity sensor and interposed between the proximity sensor and the additional proximity sensor.

16. The robot system of claim 1, wherein the sensing element of force or torque comprises a sensor selected from the group consisting of: a pressure sensor, a contact force sensor, and an air sensor having a deformable air chamber.

17. The robot system according to claim 1, wherein the proximity sensor comprises a proximity sensor selected from the group consisting of: an ultrasonic proximity sensor, an optical proximity sensor, a radio proximity sensor, and a capacitive proximity sensor.

18. The robot system according to claim 1, wherein the one or more processors is configured to control a programmed speed of the movable parts to always fall below a speed limit.

19. A method of operating a robot, the method comprising:
- with at least one actuator, moving one or more movable parts of the robot;
- with a proximity sensor disposed on the one or more movable parts, generating first sensor data indicative of a distance between the proximity sensor and an external object;
- with a joint position sensor coupled to at least one actuator, generating second sensor data indicative of a speed of the one or more movable parts;
- stopping motion of the one or more movable parts in response to the second sensor data indicating that the speed exceeds a threshold speed;
- slowing but not stopping the motion of the one or more movable parts when the distance falls from a first distance that exceeds a first threshold distance to a second distance that is less than the first threshold distance and greater than a second threshold distance, the second threshold distance being less than the first threshold distance;
- stopping the motion of the one or more movable parts when the distance falls below the second threshold distance;
- with one or more processors, computing, based on a reading from a sensing element of force or torque, a dynamic model of the one or more movable parts to generate an estimated external force exerted on at least a tool end of the one or more movable parts, the sensing element of force or torque being different from the proximity sensor;
- slowing down a speed monitoring point to a set speed in response to the measured distance falling below the distance threshold, wherein the speed monitoring point is located at the tool end or on a tool attached to the tool end,
- stopping the one or more movable parts in response to the estimated external force exceeding a set limit, and
- stopping the one or more movable parts in response to the speed monitoring point moving faster than the speed limit.

* * * * *